July 25, 1967

R. L. GOLDEN 3,333,070

LATCHING MEANS FOR AN ON-OFF MEMBER OF A PROGRAM
CONTROLLING MEMBER OR THE LIKE

Filed Feb. 10, 1966

INVENTOR.
ROBERT L. GOLDEN

BY

*Cauldn & Cauldn*

HIS ATTORNEYS

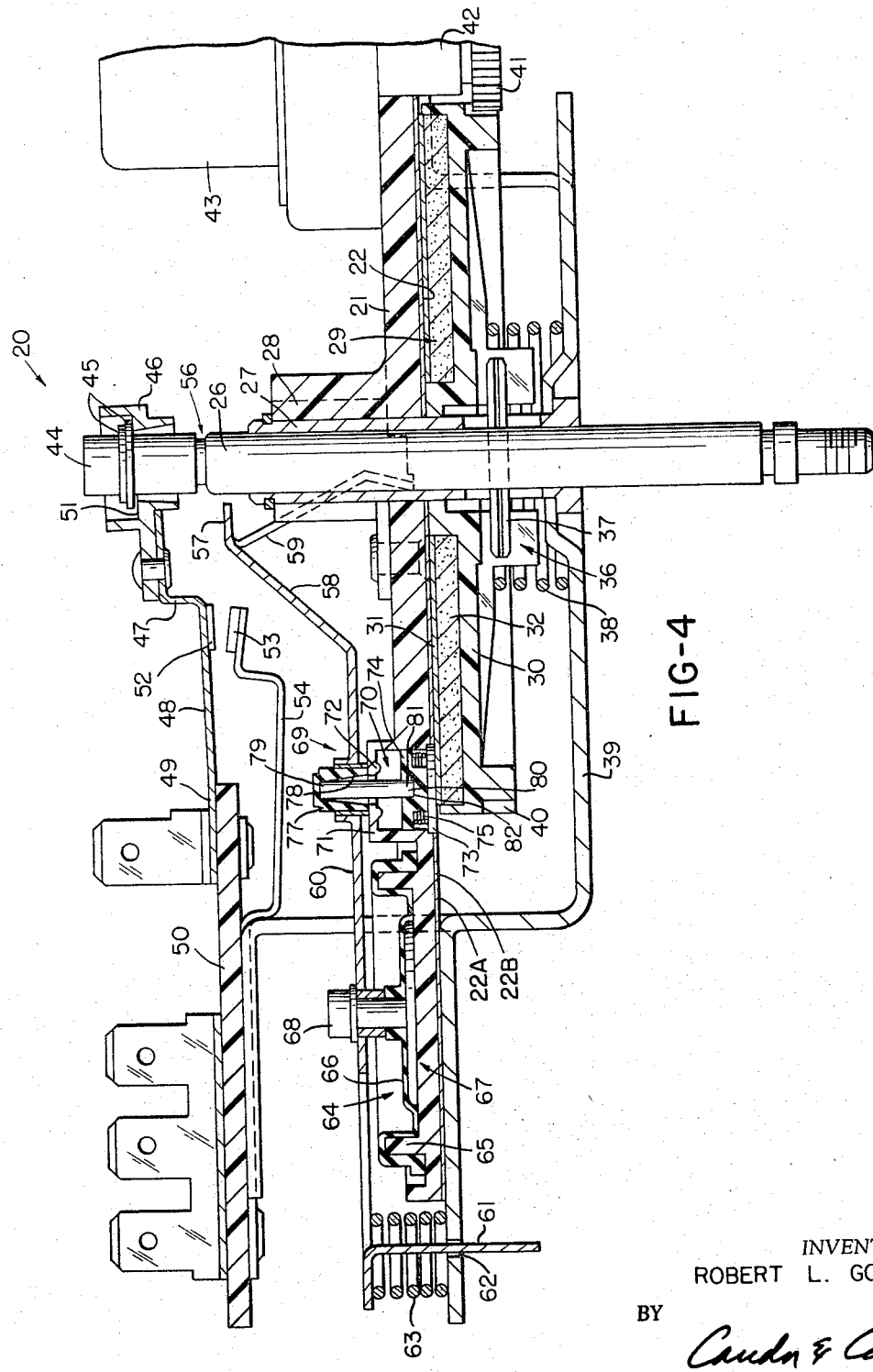

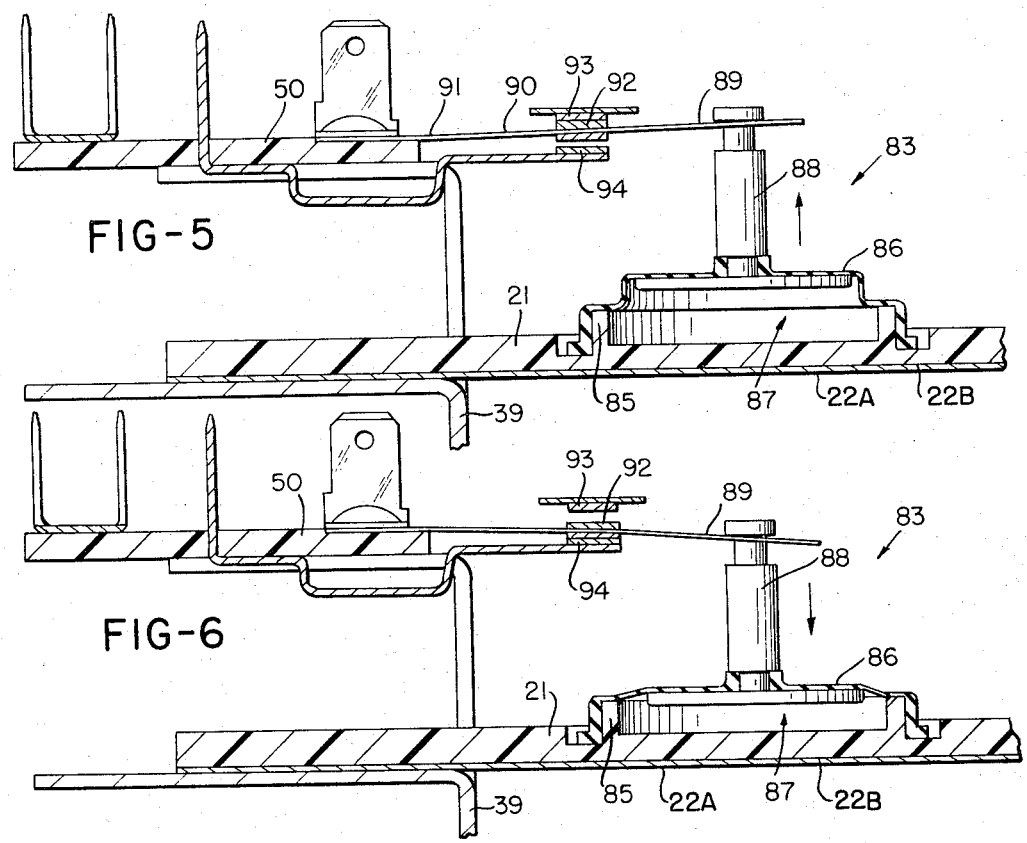
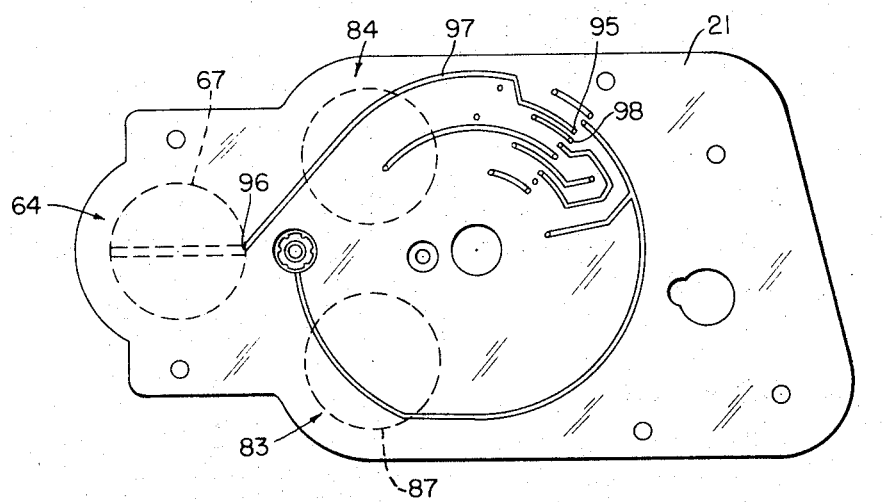

United States Patent Office 3,333,070
Patented July 25, 1967

3,333,070
LATCHING MEANS FOR AN ON-OFF MEMBER OF A PROGRAM CONTROLLING MEMBER OR THE LIKE
Robert L. Golden, Greensburg, Pa., assignor to Robertshaw Controls Company, Richmond, Va., a corporation of Delaware
Filed Feb. 10, 1966, Ser. No. 526,549
18 Claims. (Cl. 200—46)

This invention relates to an improved program controlling means for a domestic appliance or the like as well as to improved parts for such a controlling means or the like.

One feature of this invention is to provide a program controlling means which can be latched in its on position when desired so that the programming means will automatically control the operation of the domestic appliance or the like and, when the program means reaches the end of the cycle of operation thereof, the program means will automatically terminate the operation thereof.

In addition, the program means of this invention can be so constructed and arranged that the same will completely deactuate previously actuated actuators when the program means automatically terminates its operation.

Accordingly, it is an object of this invention to provide an improved program controlling means having one or more of the novel features set forth above or hereinafter shown or described.

Another object of this invention is to provide improved parts for such a programing means or the like.

Other objects, uses and advantages of this invention are apparent from a reading of this description which proceeds with reference to the accompanying drawings forming a part thereof and wherein:

FIGURE 4 is a view similar to FIGURE 2 and illustrates the control device in still another operating position thereof.

FIGURE 5 is a fragmentary, cross-sectional view taken on line 5—5 of FIGURE 1.

FIGURE 6 is a view similar to FIGURE 5 and illustrates the switch mechanism in another operating position thereof.

FIGURE 7 is a reduced cross-sectional view taken substantially on line 7—7 of FIGURE 2.

FIGURE 8 is an enlarged, fragmentary, cross-sectional view taken on line 8—8 of FIGURE 2.

Figure 1:
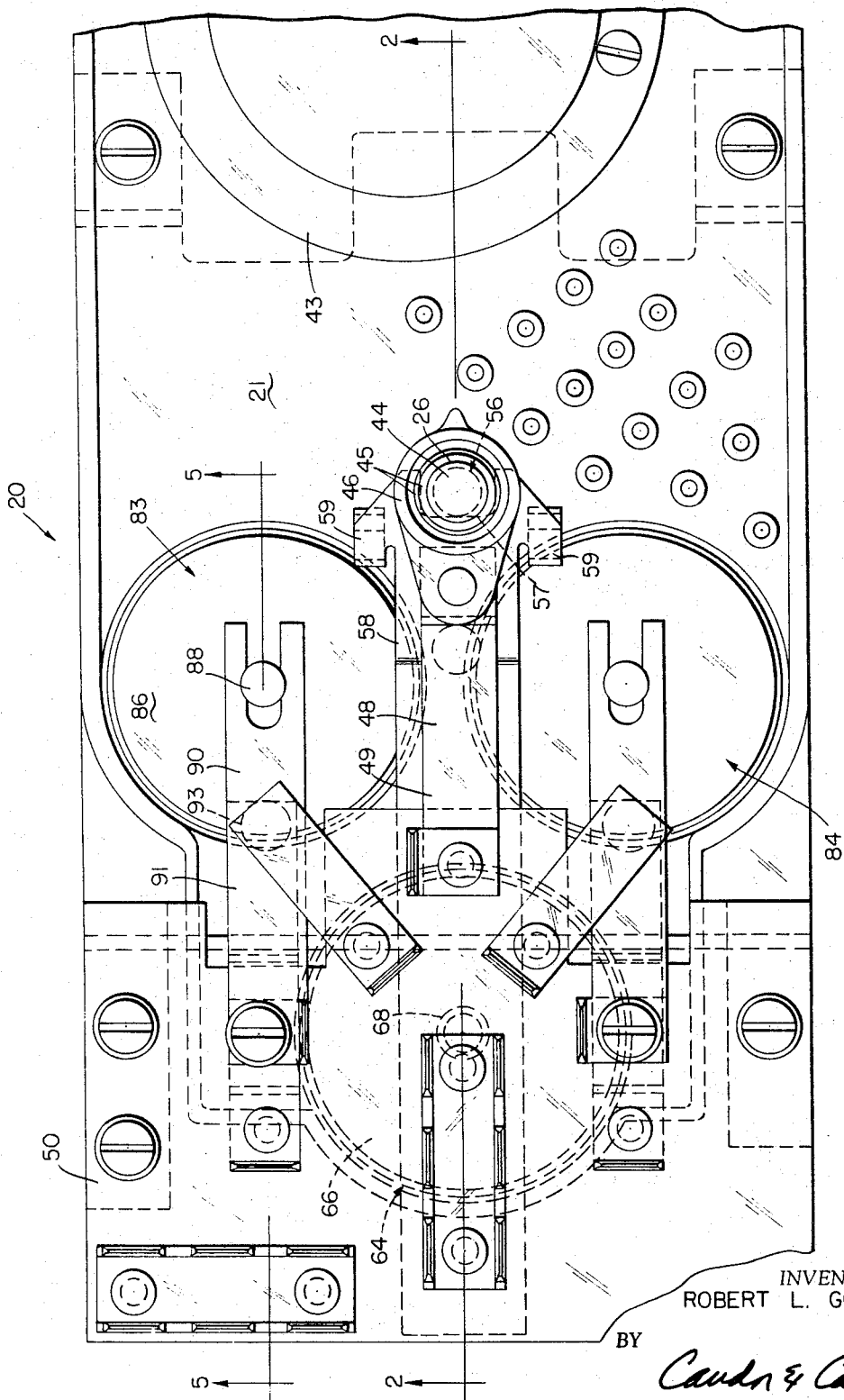
FIGURE 1 is a fragmentary top view of the improved programming means of this invention.

While the various features of this invention are hereinafter described and illustrated as being particularly adaptable to control the operation of the domestic appliance, such as a washing machine, dishwasher or the like, it is to be understood that the various features of this invention can be utilized singly or in any combination thereof to provide control means for other devices as desired.

Therefore, this invention is not to be limited to only the embodiments illustrated in the drawings, because the drawings are merely utilized to illustrate one of the wide variety of uses of this invention.

Figure 2:
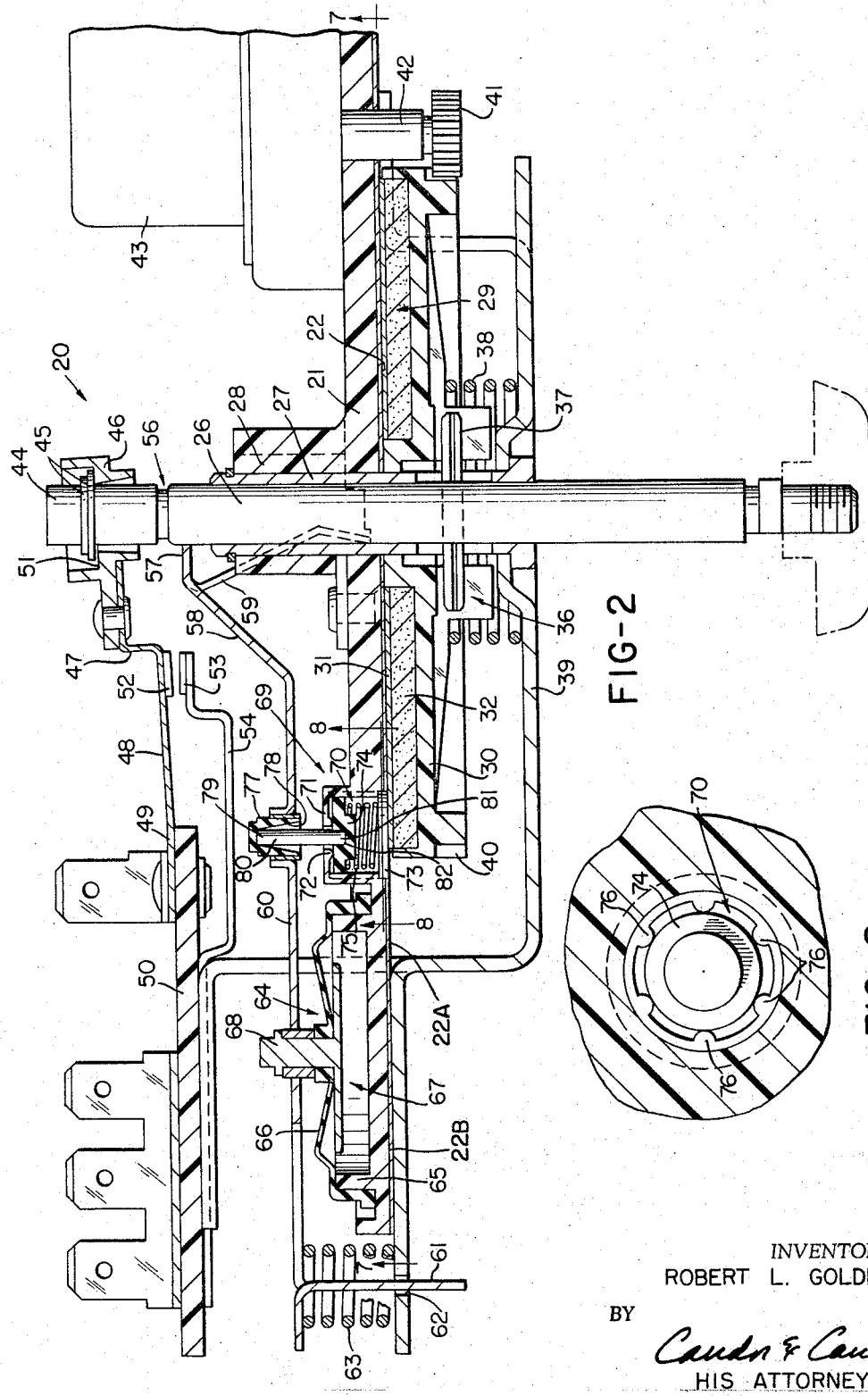
FIGURE 2 is a cross-sectional view taken on line 2—2 of FIGURE 1.
Figure 10:
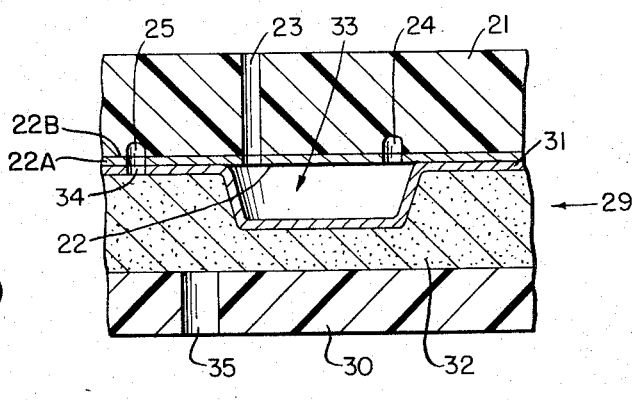
FIGURE 10 is an enlarged, fragmentary, cross-sectional view of the main program member of this invention.

Referring now to FIGURES 1 and 2, an improved programming means of this invention is generally indicated by the reference numeral 20 and comprises a plastic base means 21 having a flat reading surface 22 interrupted by a plurality of port means, such as port means 23, 24 and 25 illustrated in FIGURE 10, the flat reading surface 22 of the base means 21 being defined by a sheet of flexible tape means 22A having a pressure sensitive adhesive side thereof secured to the surface 22B of the base means 21.

In particular, the tape means 22A functions in the same manner as the reading head tape means disclosed and claimed in the copending patent application, Ser. No. 262,885, filed Mar. 5, 1963, the purpose of the tape means 22A being more fully described hereinafter.

An axially movable and rotatable control shaft 26 is provided and passes through a sleeve 27 carried in a tubular projection 28 of the base means 21. The control shaft 26 is rotationally interconnected to a program member 29 of this invention.

As illustrated in FIGURES 2 and 10, the program member 29 comprises a rigid backing member 30 operatively interconnected to a flexible reading sheet 31 in any suitable manner so that the same rotate in unison, the backing member 30 being spaced from the flexible reading sheet 31 by a porous compressible material 32.

The flexible reading sheet 31 has a plurality of channel or blister means 33 provided therein in a predetermined pattern as will be apparent hereinafter, each blister means 33 being adapted to bridge at least two ports in the reading head 21 to fluidly interconnect the same together. For example, the blister means 33 illustrated in FIGURE 10 fluidly interconnects the ports 23 and 24 together.

The flexible reading sheet 31 also has a plurality of aperture means 34 passing therethrough adapted to be aligned with certain of the ports in the reading head 21 in a predetermined sequence whereby air or the like is adapted to flow into the aligned ports, such as port 25 in FIGURE 10, by passing through a suitable aperture 35 in the backing member 30 and the porous compressible material 32 into the aligned aperture means 34 whereby the air passing to the port means 25 is filtered by the porous compressible material 32.

The rigid backing means 30 of the program member 29 telescopes over the shaft 26 and has a recess or slot means 36 provided therein and receiving a drive pin 37 carried by the shaft 26 whereby rotation of the program member 29 in a manner hereinafter described rotates the shaft 26 while the shaft 26 is axially movable relative to the program member 29 by means of the splined connection between the drive pin 37 and the slot 36.

The rigid backing member 30 of the program member 29 is urged toward the reading surface 22 of the reading head 21 by a compression spring means 38 disposed between the backing member 30 and a bracket means 39 carried by the base means 21 whereby the flexible reading sheet 31 is placed into sealing and sliding relation with the reading surface 22 of the reading head 21.

The rigid backing member 30 of the program member 29 has a ring gear means 40 on the outer periphery thereof which meshes with a pinion gear means 41 carried on an output shaft 42 of a timer motor 43 fastened to the base means 21.

When the electric timer motor 43 is energized in the manner hereinafter described, the same rotates the pinion gear 41 to rotate the program member 29 relative to the reading head 21 so that the blister means 33 and aperture means 34 in the flexible reading sheet 31 will control a plurality of actuator means in a predetermined pattern to control the operation of the domestic appliance or the like.

Figure 9:
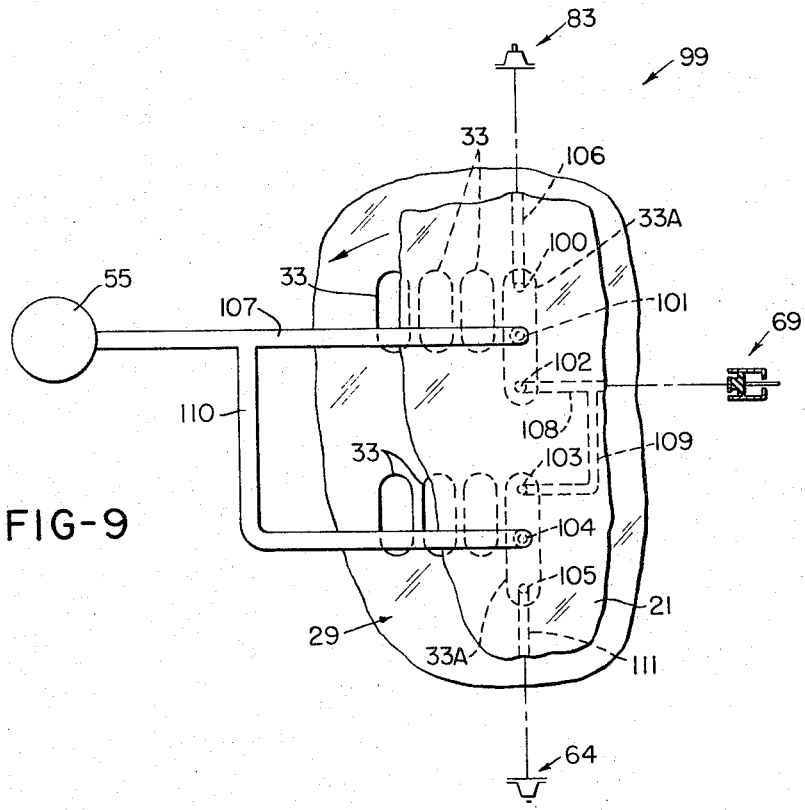
FIGURE 9 is a schematic view illustrating the control system of this invention.

The end 44 of the control shaft 26 carries retainers 45 and telescopically receives a tubular member 46 interconnected to the free end 47 of a spring switch blade 48 having the other end 49 thereof interconnected to a terminal post platform 50 interconnected to the previously described bracket means 39. The tubular member 46 has a shoulder 51 which bears against the lower surface of the retainer means 45 on the control shaft 26 whereby the spring blade 48 has sufficient force to normally hold the control shaft 26 in the axial position illustrated in FIGURE 2. In this manner, a contact 52 carried by the switch blade 48 will be normally disposed out of contact with a contact 53 carried on a switch blade 54. When the contact 52 is placed into electrical contact wtih contact 53 by downward axial movement of the control shaft 26 from the position illustrated in FIGURE 2 to the position illustrated in FIGURE 3, the timer motor 43 as well as a vacuum pump 55, FIGURE 9, are energized and remain energized until the contacts 52 and 53 separate in the manner illustrated in FIGURE 2.

The control shaft 26 has an annular locking groove 56 provided in the end 44 thereof to receive a latching end 57 of a latch member 58 pivotally mounted to the base means 21.

Figure 3:
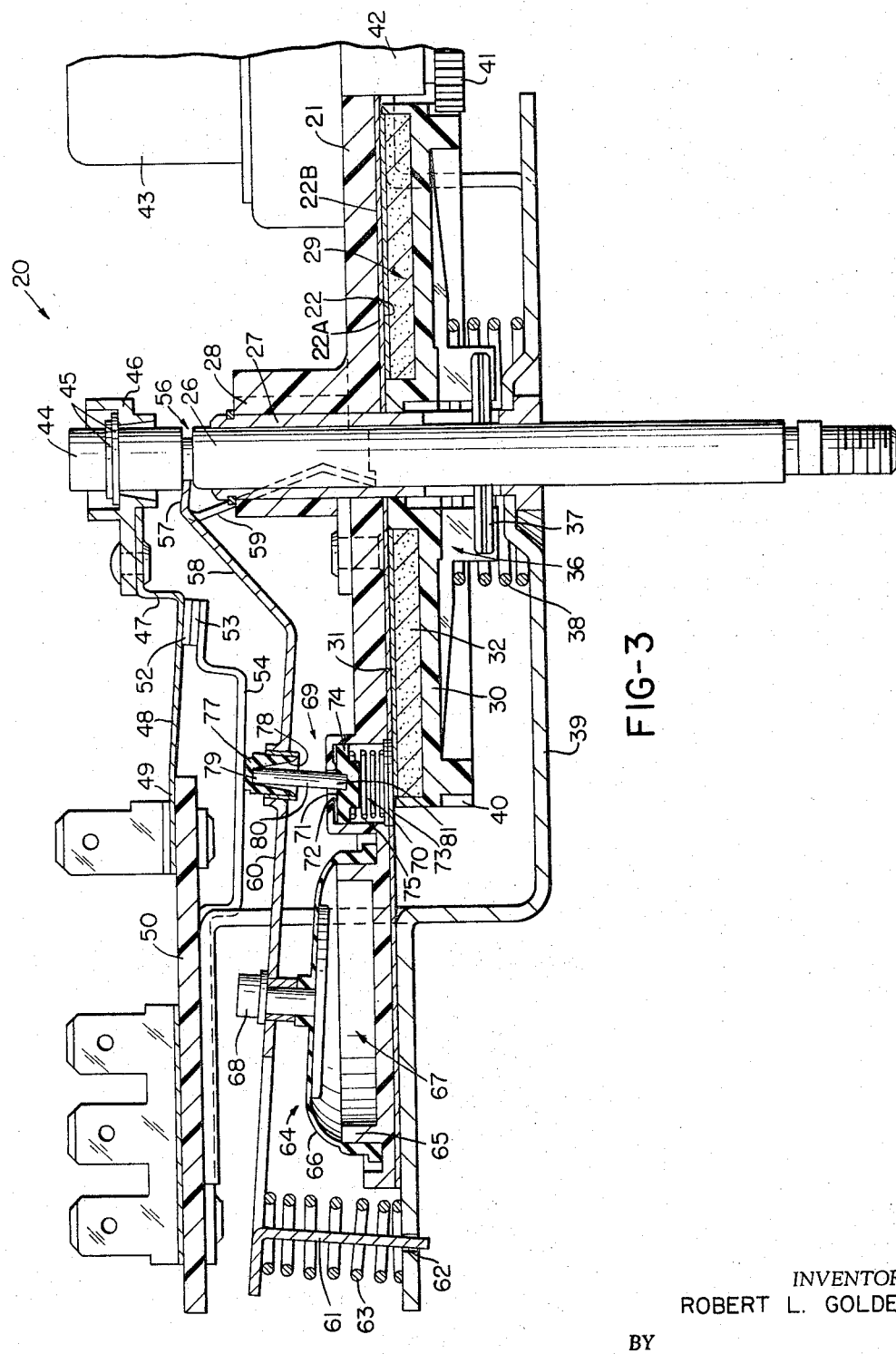
FIGURE 3 is a view similar to FIGURE 2 and illustrates the control mechanism in another operating position thereof.

In particular, it can be seen in FIGURES 1 and 2 that the latch member 58 has a pair of depending legs 59 provided with ends receivable in slots provided in the top surface of the base means 21 whereby the latch member 58 is adapted to pivot relative to the base means 21 between the positions illustrated in FIGURES 3 and 4.

The latch member 58 has an extension 60 provided with a downwardly directed tang 61 passing through a slot 62 in the bracket 39 to guide pivotal movement of the latch member 58.

If desired, a compression spring 63 can be disposed between the bracket 39 and the end 60 of the lever 58 to normally tend to pivot the same in a clockwise direction.

A pneumatic or a vacuum operated actuator 64 is carried by the base means 21 and comprises an annular flange 65 on the base means 21 interconnected to a flexible diaphragm 66 to define a chamber 67 between the diaphragm 66 and the base means 21. The flexible diaphragm 66 carries an actuating post 68 fastened to the extension 60 of the lever 58 in any suitable manner. Thus, when the chamber 67 of the actuator 64 is interconnected to the vacuum source 55 in a manner hereinafter described, the diaphragm 66 is moved downwardly to the position illustrated in FIGURE 4 to pivot the latching member 58 in a counterclockwise direction for a purpose hereinafter described.

A dump valve structure 69 is carried by the base means 21 and comprises a chamber 70 having one end 71 provided with a valve seat 72 interconnecting the chamber 70 with the atmosphere. The other end of the chamber 70 is closed by a suitable plug means 73. A movable valve member 74 is disposed in the chamber 70 and is normally urged in sealing relation against the valve seat 72 by a compression spring 75 disposed between the valve member 74 and the plug 73.

As illustrated in FIGURE 8, the valve member 74 is guided for axial movement within the chamber 70 by a plurality of inwardly directed ribs 76 in the chamber 70 whereby when the valve member 74 is moved away from the valve seat 72, the chamber 70 is interconnected to the atmosphere.

A cup-shaped retainer 77 is carried by the extension 60 of the latching member 58 and has the recess 78 thereof receiving one end 79 of an actuating pin 80 having the other end 81 thereof passing through the valve seat 72 and being received in a recess 82 of the valve member 74.

In this manner, when the latch member 68 is pivoted from the position illustrated in FIGURE 3 to the position illustrated in FIGURE 4 upon the evacuation of the chamber 67 of the actuator 64 in a manner hereinafter described, the valve member 74 is moved away from the valve seat 72 to interconnect the chamber 70 to the atmosphere for a purpose hereinafter described.

As illustrated in FIGURE 1, two other vacuum operated actuating means 83 and 84 are carried by the base means 21 and respectively operate electrical switch means carried by the plate means 50 previously described.

Since the actuating means 83 and 84 are substantially identical, only the actuating means 83 of FIGURE 1 is fully illustrated in FIGURES 5 and 6.

In particular, the actuating means 83 is formed by an annular projection 85 on the base means 21 cooperating with a flexible diaphragm 86 to define a chamber 87 therebetween.

The flexible diaphragm 86 carries an actuating post 88 interconnected to a free end 89 of a spring switch blade 90 having the other end 91 thereof fastened to the terminal plate means 50, the switch blade 90 carrying an electrical contact 92 which is disposed in electrical contact with a fixed contact 93 when the actuator 83 is at atmospheric conditions and which is placed into electrical contact with another contact 94 when the chamber 87 of the actuating means 83 is evacuated in the manner illustrated in FIGURE 6.

In order to interconnect the chambers of the actuators 64, 83 and 84 with the pneumatic source 55, the program member 29 utilizes the blister means 33 to interconnect together a vacuum source port with a port leading to the particular chamber of the particular actuator.

For example, reference is made to FIGURE 7 wherein it can be seen that a port 95 formed in the reading head 21 and passing through the tape means 22A is adapted to be interconnected to a port 96 passing through the base means 21 and aligned with the chamber 67 of the actuator 64 by means of a groove means 97 formed in the surface 22B of the base means 21, the groove means 97 being covered with the tape means 22A whereby the groove means 97 and port 96 are sealed from the atmosphere but are in fluid communication with the port 95 in the manner fully disclosed and claimed in the aforementioned copending patent application. Therefore, an adjacent port 98 formed in the reading head 21 and passing through the tape means 22A can be interconnected to the vacuum source 55 so that when a blister means 33 of the program sheet 31 bridges the ports 98 and 95, the vacuum source 55 is interconnected to the chamber 67 of the actuator 64 and pulls the post 68 downwardly from the position illustrated in FIGURE 3 to the position illustrated in FIGURE 4 for a purpose hereinafter described.

Alternately, various ports in the reading head 21 controlled by the program member 29 can be interconnected to the actuator means by flexible conduits if desired.

In any event, it can be seen in FIGURE 9 that a control system 99 can be provided wherein the reading head 21 has a plurality of aligned ports 100, 101, 102, 103, 104 and 105 formed therein and passing through the single sheet of tape means 22A, the port 100 being interconnected to the chamber of the actuator 83 by tape covered groove means 106, the port 101 being interconnected to the inlet of the vacuum pump 55 by flexible conduit means 107, the port 102 being interconnected to the chamber 70 of the dump valve 69 by tape covered groove means 108, the port 103 being interconnected to the chamber 70 of the dump valve 69 by tape covered groove means 109, the port 104 being interconnected to the inlet of the vacuum pump 55 by flexible conduit means 110 and the port 105 being interconnected to the chamber 67 of the actuator 64 by tape covered groove means 111 whereby it can be seen that the single sheet of tape means 22A seals the aforementioned grooves and associated ports from the atmosphere except where the ports pass through the tape means 22A.

Therefore, it can be seen that as the program member 29 moves relative to the reading head 21, the blister means 33 thereof can bridge the ports 100 and 101 at the desired time in the program to interconnect the vacuum source to the actuator 83 to actuate the same. Similarly, other blister means 33 can interconnect together the ports 103 and 104 to actuate the actuator 64 at the desired time in the cycle of the program being controlled by the program member 29.

The operation of the system illustrated schematically in FIGURE 9 as well as structurally in the other figures of the drawings will now be described.

With the system 99 in the off position illustrated in FIGURE 2, the operator rotates the control shaft 26 to the desired starting position as indicated by a control knob on the shaft 26 to position the program member 29 at the proper position relative to the reading head 21 for a particular program. Thereafter, the operator pulls downwardly on the shaft 26 from the position illustrated in FIGURE 2 to the position illustrated in FIGURE 3 whereby the groove means 56 in the shaft 26 is now aligned with the latching end 57 of the latching member 58 so that the end 57 is received in the groove means 56 because of the force of the compression spring 63 tending to pivot the latch member 58 in a clockwise direction. At the same time that the latching member 58 is received in the groove 56, the downward movement of the shaft 26 has carried the tubular member 46 therewith a sufficient distance to bend the spring blade 48 downwardly and place the contact 52 into electrical contact with the contact 53 whereby the timer motor 43 and vacuum pump 55 are energized.

With the shaft 26 now pulled outwardly to the position illustrated in FIGURE 3 and latched in such outward position by the latch member 58 in the above manner, the timer motor 43 rotates the program member 29 relative to the reading head 21 to cause the blister means 33 to interconnect together the energized vacuum source 55 with various vacuum actuators to control the cycle of operation of the domestic appliance or the like, the aperture means 34 deactuating various actuators as the program member 29 rotates.

When the program member 29 is rotated to its end of cycle position, it can be seen in FIGURE 9 that large blister means 33A are respectively interconnected together the three ports 100, 101, 102 and 103, 104, 105 whereby the vacuum source 55 is interconnected to the actuators 83 and 64.

When the actuator 83 is interconnected to the vacuum source 55, it can be seen that the same pulls the post 88 downwardly from the position illustrated in FIGURE 5 to the position illustrated in FIGURE 6 to place the electrical contact 92 out of contact with the contact 93 and into contact with the contact 94 to produce a certain function in the apparatus.

Similarly, the vacuum source 55 is now interconnected to the chamber 67 of the actuator 64 whereby the diaphragm 66 is pulled downwardly from the position illustrated in FIGURE 3 to the positions illustrated in FIGURE 4 to cause counterclockwise pivoting movement of the latch member 58 whereby the latching end 57 of the latch member 58 is withdrawn from the groove 56 of the shaft 26 so that the force of the spring means 48 will axially move the shaft 26 from the position illustrated in FIGURE 3 back to the position illustrated in FIGURE 4 whereby the contacts 52 and 53 are separated to deenergize the electric motor 43 and the vacuum pump 55.

However, since certain actuator means of the system 99 of this invention have been previously actuated, it is desirable to have such actuators rapidly deactuated, so that the previously actuated actuator means will be in their normal off position.

Therefore, it can be seen that when the actuator 64 is actuated from the position illustrated in FIGURE 3 to the position illustrated in FIGURE 4, the valve member 74 of the dump valve 69 is moved away from the valve seat 72 to interconnect the chamber 70 thereof to the atmosphere and, thus, to interconnect certain of the chambers of the actuator means to the atmosphere.

For example, it can be seen in FIGURE 9 that when the dump valve 69 is opened, the air is adapted to enter the open chamber 70 and flow through the tape covered groove means 109 and 108 and, thus, by the enlarged blisters 33A to the chambers of the actuators 83 and 64 to deactuate the same so that the same return to the normal position as illustrated in FIGURE 2.

When the actuator 64 returns to the deactuated position illustrated in FIGURE 2, it can be seen that the dump valve 69 is now closed and that the program means 20 is adapted to be again operated in the above manner when desired.

Accordingly, it can be seen that improved means are provided for controlling the program means 20 of this invention so that when the same is turned to its on position, the same is latched in its on position until the program member automatically turns off the program means 20 at the end of cycle position thereof.

Accordingly, it can be seen that this invention not only provides an improved programming means for controlling the operation of a domestic appliance or the like, but also this invention provides improved parts for such a program controlling means or the like.

While the form of the invention now preferred has been disclosed as required by the statutes, other forms may be used, all coming within the scope of the claims which follow.

What is claimed is:

1. In combination, a frame means, a program member for controlling a cycle of operation of an apparatus and being mounted for movement on said frame means, an on-off member for moving said program member relative to said frame means to set said program member at a desired position relative to said frame means and being movable between an off position and an on position thereof without effecting movement of said program member, a latch member pivotally mounted to said frame means for holding said on-off member in its on position when said latch member is pivoted to its latching position, and means separate from said on-off member for pivoting said latch member to its unlatching position without requiring movement of said on-off member so that said on-off member can move to its off position.

2. A combination as set forth in claim 1 wherein spring means are provided for normally tending to pivot said latch member to its latching position.

3. A combination as set forth in claim 1, wherein spring means are provided for normally tending to move said on-off member to its off position.

4. A combination as set forth in claim 1 wherein said program member is mounted for rotation on said frame means and wherein said on-off member comprises a shaft for rotating said program member and being axially movable relative to said frame means between said off position and said on position thereof.

5. A combination as set forth in claim 4 wherein motor means are carried by said frame means for rotating said program member when said motor means is actuated, and an actuator carried by said frame means and operatively interconnected to said shaft, said actuator being actuated to actuate said motor means when said shaft is in said on position thereof and said actuator being deactuated to deactuate said motor means when said shaft is in said off position thereof.

6. A combination as set forth in claim 5 wherein said actuator comprises an electrical switch.

7. A combination as set forth in claim 1 wherein said means for pivoting said latch member comprises a pneumatically operated actuator carried by said frame means and operatively interconnected to said latch member, said actuator pivoting said latch member to its unlatching position so that said on-off member can move to its off position when said actuator is interconnected to a pneumatic source.

8. A combination as set forth in claim 7 wherein said program member has means for interconnecting said source to said actuator.

9. A combination as set forth in claim 7 wherein said actuator includes a flexible diaphragm that cooperates with said frame means to define a chamber therebetween that is connectable to said source for flexing said diaphragm.

10. A combination as set forth in claim 1 wherein said on-off member has an annular groove provided therein and said latch member is received in said groove to latch said on-off member in its on position.

11. A combination as set forth in claim 1 wherein said latch member has leg means received in slot means of said frame means to pivotally mount said latch member to said frame means.

12. In combination, a frame means, a program member for controlling a cycle of operation of an apparatus and being mounted for movement on said frame means, an on-off member for moving said program member relative to said frame means to set said program member at a desired position relative to said frame means and being movable between an off position and an on position thereof without effecting movement of said program member, a latch member movably mounted to said frame means for holding said on-off member in its on position when said latch member is moved to its latching position, means for moving said latch member to its unlatching position so that said on-off member can move to its off position, and valve means carried by said frame means and being directly connected to said latch member, said valve means being closed when said latch member is in its latching position and being opened when said latch member is moved to its unlatching position by said last-named means.

13. A combination as set forth in claim 12 wherein said valve means includes a valve seat and a movable valve member for opening and closing said valve seat, said latch member being operatively interconnected to said valve member.

14. A combination as set forth is claim 12 wherein said latch member is mounted for pivotal movement relative to said frame means.

15. A combination as set forth in claim 12 wherein said program member is mounted for rotation on said frame means and wherein said on-off member comprises a shaft for rotating said program member and being axially movable relative to said frame means between an off position and an on position thereof.

16. A combination as set forth in claim 12 wherein said means for moving said latch member comprises a pneumatically operated actuator carried by said frame means and operatively interconnected to said latch member, said actuator moving said latch member to its unlatching position so that said on-off member can move to its off position.

17. In combination, a frame means, a program member for controlling a cycle of operation of an apparatus and being mounted for movement on said frame means, an on-off member for moving said program member relative to said frame means to set said program member at a desired position relative to said frame means and being movable between an off position and an on position thereof without effecting the movement of said program member, a latch member pivotally mounted to said frame means for holding said on-off member in its on position when said latch member is pivoted to its latching position, means separate from said on-off member for pivoting said latch member to its unlatching position without requiring movement of said on-off member so that said on-off member can move to its off position, said program member being mounted for rotation on said frame means, said on-off member comprising a shaft for rotating said program member relative to said frame means and being axially movable relative to said frame means between said on position and said off position thereof, timer means for rotating said program member when said timer means is actuated, an actuator carried by said frame means and being operatively interconnected to said shaft, said actuator being actuated to actuate said timer means when said shaft is in said on position thereof, said means for pivoting said latch member comprising a pneumatically operated actuator carried by said frame means and being directly connected to said latch member, said pneumatically operated actuator pivoting said latch member to its unlatching position so that said shaft can move to its off position when said pneumatically operated actuator is interconnected to a pneumatic source.

18. In combination, a pneumatic source, a plurality of pneumatically operated actuator means, a frame means, a program member for controlling a cycle of operation of an apparatus and being mounted for movement on said frame means, an on-off member for moving said program member and being movable between an off position and an on position thereof, a latch member movably mounted to said frame means for holding said on-off member in its own position when said latch member is moved to its latching position, means for moving said latch member to its unlatching position so that said on-off member can move to its off position, and valve means carried by said frame means and being directly connected to said latch member, said valve means being closed when said latch member is in its latching position and being opened when said latch member is moved to its unlatching position by said last-named means, said last-named means for moving said latch member comprising a pneumatically operated actuator carried by said frame means and being operatively interconnected to said latch member, said actuator moving said latch member to its unlatching position so that said on-off member can move to its off position, said program member interconnecting said pneumatic source to said actuator means as said program member rotates relative to said frame means, said valve means interconnecting certain of said actuator means to the atmosphere when said valve means is opened.

References Cited
UNITED STATES PATENTS

| | | | |
|---|---|---|---|
| 1,390,336 | 9/1921 | Buchi | 200—39 |
| 2,385,293 | 9/1945 | Logan | 200—169 |
| 3,177,898 | 4/1965 | Scott et al. | 137—624.11 |
| 3,237,646 | 3/1966 | Houser et al. | 200—83 |
| 3,268,683 | 8/1966 | Palmer | 200—46 |
| 3,284,589 | 11/1966 | Golden et al. | 200—46 |

BERNARD A. GILHEANY, *Primary Examiner.*

H. E. SPRINGBORN, *Assistant Examiner.*